United States Patent Office 2,996,485
Patented Aug. 15, 1961

2,996,485
CHLORINATION OF COUMARONE-INDENE RESINS
James R. Patterson, Walter H. Williams, and John J. Freeman, Pittsburgh, Pa., assignors to Neville Chemical Company, Pittsburgh, Pa., a corporation of Pennsylvania
No Drawing. Filed Apr. 11, 1956, Ser. No. 577,440
4 Claims. (Cl. 260—81)

This invention relates to an improved process for chlorinating synthetic resins, especially of the coumarone-indene type, and to chlorinated resins, particularly those containing high proportions of chlorine.

Coumarone-indene type resins have long formed an important class of resins useful in many fields. These are made from selected distillate fractions which are essentially hydrocarbon in character, resulting from the pyrolysis of coal, petroleum, or other oils. Fractions boiling from about 160° C. to 210° C. or more specifically between about 170°–185° C. obtained from distillates prepared from tars, etc., resulting from the coking of coal or the manufacture of synthetic heating gases such as carbureted water gas, contain polymerizable materials including indene, methyl indene, coumarone, styrene, methyl styrene, cyclopentadiene, etc. Distillate fractions of severely cracked petroleum or other oils may contain similar hydrocarbons, while less severely cracked products contain linear olefins, cyclohexadienes, methyl cyclopentadiene, etc. The coumarone-indene type resins as referred to herein are prepared from these charging stocks by methods which are well known and need not be described in detail.

We have found that when these resins are subjected to chlorination in molten condition and in the absence of a solvent and catalyst, as is disclosed in McCoy Patent 1,245,363, the resulting resin is dark colored, unstable to heat, and generally of low chlorine content. Relatively low molecular weight resins (about 200 to about 300) may be chlorinated by the McCoy process over substantial periods of time to yield products having up to about 48% chlorine, for example, at 120° C. for eight hours. The products are inferior, being dark colored and very unstable to heat, as well as possessing a sharp acidic odor. Resins of the coumarone-indene type having a molecular weight of 440 to 660 have been chlorinated at 120° C., although the time of chlorination was necessarily limited because the chlorinated product becomes in a short time too thick and viscous to be stirred. Only 23.8% and 14.7% of chlorine could be introduced into these resins at an operating temperature of 120° C. Higher temperatures cannot be used because of charring, carbonization, and degradation of the resin caused severally and jointly by the presence of chlorine and hydrogen chloride. It is impossible for these reasons to chlorinate any resin having a melting point above about 100° C. A large proportion of the coumarone-indene type resins which are available commercially have substantially higher melting points. We have found that if the resin is dissolved in an inert solvent and chlorinated in the absence of a catalyst, the proportion of chlorine combining may be increased. The color and in some instances the heat stability is improved, but the latter is still unsatisfactory.

If the chlorination of the dissolved resin is carried out in the presence of catalysts such as iron, nickel, cobalt, iodine, etc, the proportion of chlorine which can be introduced into the resin may be further increased and the time of chlorination and amount of chlorine used is decreased markedly. There is a further improvement particularly in heat stability when tested at 180° C., in accordance with ASTM Procedure D–793–49.

By passing chlorine through a solution of the resin and in the presence of a catalyst such as iron or the like and in the presence of iodine, a still further improvement is obtained, particularly with respect to chlorine consumption, time of reaction, and increased chlorine content.

According to our novel procedure, we are enabled to produce improved products which are light in color, have a mild pleasant odor, and have high thermal stability as compared with those which have been produced by prior art processes.

Furthermore, we have found that we can introduce chlorine into the resin in proportions far in excess of that which can be introduced by known processes. Moreover, we can chlorinate resins of the coumarone-indene type which heretofore could not be chlorinated. We have succeeded in producing chlorinated resins containing up to about 70% of chlorine which have a color of less than 10, according to the Neville Color Scale, and generally of 5 or substantially below 5, and which can be heated to 180° C. with the evolution of only negligible amounts of hydrogen chloride comparable with or superior to commercial resins (not of the coumarone-indene type) containing chlorine. These chlorinated resins have no flash or fire point below 760° F. and hence are useful for many purposes which require fire resistance. Coatings containing our chlorinated resins intumesce when subjected to fire, and the decomposition products include chlorine and hydrogen chloride which are non-combustible. Both phenomena tend to protect combustible surfaces to which such coatings are applied.

The chlorinated products are soluble in many solvents and can be employed as coating materials, extender resins particularly for the vinyl resins, impregnating agents, for example, in electrical insulation, as adhesives, and for many other purposes where flame resistance or substantially absolute flame-proofness are important. These high chlorine-content resins are novel as far as we are aware, and constitute a part of our invention.

In one specific embodiment the invention comprises subjecting a coumarone-indene type resin to chlorination by dissolving said resin in a suitable solvent and passing chlorine through the solution in the present of elemental iodine with or without the addition of a second chlorination catalyst such as iron. Conducting the reaction in an iron vessel gives some improvement but is not as good as adding finely divided iron to the mixture in a vessel of iron, glass, etc.

The polymeric resins which may be treated in the present invention may have a molecular weight in the range of, for example, 200 to 5000 and preferably about 350 to 5000 or higher. They comprise resins generally known as the coumarone-indene type and are made by polymerizing materials described above.

Any solvent which is not of itself affected by the chlorination reaction may be used. These include, but are not limited to, such solvents as carbon tetrachloride, chlorobenzene, chloroform, dichloroethane, tetrachloroethane, ethylene dichloride, to name a few. The solvent is not critical, it being only necessary that it not react to form undesirable by-products.

In general, the proportion of dissolved starting resin covers a wide range which is limited only by the solubility of the resin and the chlorinated resin in the solvent; and by the viscosity of the resulting solution at operating temperatures. The proportions may range from about 1% to about 50% by weight of resin in the solution depending upon the characteristics of the resin being chlorinated, the temperature and other operating conditions. Usually and preferably the solution will contain from about 2% to about 20% by weight of resin. Solutions falling within the preferred range generally have sufficiently low viscosities as to not present processing problems either during the chlorination or working up of the product.

The proportion of iodine employed, based upon the resin in solution, is usually about 0.5% to 20% and good results have been obtained when using about 2% to about 8%. The iodine may be added in its entirety at the beginning of the reaction, or part of it may be added initially and the remainder added in increments during the chlorination period. The latter procedure appears to have some advantage, partcularly when the reaction is carried out over a substantial period of time. This may be because some of the iodine may be lost in the exit gases possibly as the mono- or tri-chloride. The iron or other catalyst may be used in like amounts and may be added in a like manner. Since iron, nickel, cobalt, etc. are not volatile, they are more advantageously and conveniently added at one time.

The temperature at which the chlorination reaction may be carried out varies over a wide range. We have produced satisfactory products containing varying amounts of chlorine, such as 50% to 68%, which are of good color and exhibit good heat stability, at chlorinating temperatures ranging from about 0° C. to 65° C. when operating at atmospheric pressure. The reaction can be carried out at temperatures of −40° C. to higher temperatures, say 100° C. When temperatures are used which are above that at which the solvent can be refluxed, superatmospheric pressures must be employed. In general, the temperatures employed should be below that at which undesirable degradation reactions occur. The original resins begin to darken at about 200° C. and to decompose at 300° C. At about 150° C. charring of the resins becomes serious in the presence of hydrogen chloride evolved during the reaction. Moreover, the iodine may be lost because of vaporization if the temperature is too high. While the chlorination will proceed at somewhat higher temperatures, there appears to be no practical advantage in using temperatures above about 100° C.

In batch operations we have produced chlorinated coumarone-indene resins containing from about 50% to about 70% chlorine with contact time ranging from about one-half hour to about twenty-four hours. In general, if it is desired to exceed about 60% chlorine content in the final resin, the time of chlorination should preferably range from about three to about eight hours. The chlorination can also be carried out in continuous operation, for example, by flowing the solution of coumarone-indene type resin countercurrently to the chlorine in a packed column or the like.

The proportions of chlorine employed, i.e., moles of chlorine per mole of resin to be chlorinated will depend, of course, upon the molecular weight of the resin being treated and upon the degree of chlorination desired.

The polyindene unit has the empirical formula $(C_9H_8)_n$ and polycoumarone $(C_8H_6O)_n$. By replacing all of the hydrogen atoms with chlorine the empirical formula becomes $(C_9Cl_8)_n$ and $(C_8Cl_6O)_n$ respectively. The ultimate degree of chlorination would be to introduce six additional atoms to saturate the three carbon-to-carbon double bonds in each benzene nucleus and the formulas become $(C_9Cl_{14})_n$ and $(C_8Cl_{12}O)_n$. If all of the hydrogen atoms on the polycoumarone unit and all of the hydrogen atoms on the polyindene unit are replaced with chlorine, an additional six, or eight, atoms of chlorine (depending on the unit) will be converted to hydrogen chloride.

Thus, is a pure indene resin molecule were seven monomer units in length, $(C_9H_8)_7$, complete substitution of hydrogen would require 56 moles of chlorine, of which half combines with the resin and half is evolved as hydrogen chloride. The product here is represented by the formula $(C_9Cl_8)_7$ and the chlorine content is about 72% by weight.

In order to completely saturate the double bonds, an additional 42 moles of chlorine would be required, no hydrogen chlorine being evolved. Such a product would contain about 82% by weight of chlorine and have a formula $(C_9Cl_{14})_7$.

The charging stock from which coumarone-indene resins are produced contain other polymerizable materials, the molecular weight, hydrogen content, degree of unsaturation and reactivity with chlorine varying. The principal reaction, however, appears to be substitution and hence for a given level of chlorine content of the finished product, an equal weight of chlorine will have been consumed and evolved as hydrogen chloride. The sum of the chlorine content of the resin plus the chlorine equivalent of the hydrogen substituted thereby would represent the absolute minimum of chlorine to be charged if it were all reacted. As a practical matter an excess of chlorine must be employed. Thus, to produce pure indene resin seven monomers in length containing 60% chlorine, would require a theoretical weight ratio of chlorine to resin of about 3:1.

In actual practice when employing no catalyst and using a low molecular weight polymer, the maximum chlorine content obtained was about 50% and 54% and required chlorine-to-resin weight ratios of 26:1 and 40:1. In contrast to this when using a catalyst of the iron group in conjunction with iodine, comparable chlorination can be obtained with a weight ratio of chlorine to resin of as little as about 1.7:1. When the weight ratio is increased, say to 2.5–4:1, the degree of chlorination is increased to values in excess of the maximum that can be obtained without catalyst, and may range from more than 55% to about 60% or more. Ratios of 8:1 gave excellent results, the resins containing 65% or more of chlorine. There appears to be little advantage in increasing the ratio beyond 16–20:1 except possibly when the highest degree of chlorination is desired.

The various catalysts in and of themselves are not exactly equivalent. When using iron alone, weight ratios of approximately 8:1 over a four hour time period yielded resins containing more than 52% of chlorine. With the same ratio over a period of seven hours, the chlorine content was increased to about 55% while in order to obtain approximately 61% chlorination the weight ratio of about 26:1 was required.

Iodine, when use alone, required lower weight ratios of chlorine to resin than did iron. At about 1.74:1 ratio, approximately 48.8% chlorination was obtained. At a weight ratio of 4:1 to 8:1 in four to eight hours, the chlorine content ranged from about 55% to 63%.

When using iron and iodine, the efficiency of the chlorine utilization is increased and in general the ratio of chlorine to resin may be less than with either catalyst separately. The chlorinated products in the range of about 43% to about 54% chlorine content are in every case more stable when produced catalytically than when no catalyst is used. Thus, when no catalyst is used, the stability of resins with these chlorine contents ranged from about 2.5:3 while those chlorinated in the presence of iron and iodine ranged from about 0.3 to less than 0.1 The product produced when using iodine alone was somewhat less stable than those produced with the iron catalyst or the combined catalyst, especially at chlorine contents below about 60%, being approximately 1.0 at about 43% chlorine content.

The values given in the foregoing discussion were for starting resins of about 800 molecular weight. They vary considerably for various resins of the class under discussion, depending on their composition and molecular weight.

The stability of catalytically chlorinated resins increases rapidly as the chlorine content increases.

It may thus be seen that the degree of chlorination, the stability of the product, the chlorine consumption and the time factor all favor the combined iron and iodine catalyst, although useful products can be produced by the use of either iron or iodine separately. In general, the chlorine to resin weight ratio should be at least about 1.7:1 and is preferably in the range of about 2.5:1 to about 8.0:1 to produce chlorinated coumarone-indene type resins containing from approximately 50% to about 65% chlorine and when using iodine in combination with a metal of the iron group.

It should be pointed out that bromine is not the equivalent of iodine in this reaction. Bromine itself appeared to have a mild catalytic action producing a resin containing about 37.9% chlorine from a resin of 800 molecular weight. Under comparable conditions, iron produced the same degree of chlorination, while with iodine the chlorine content was about 57.8% chlorine. A combination of bromine and iron increased the chlorine content only to about 40.3%, while the combination of iron and iodine yielded a resin containing about 62.2% chlorine.

It does not appear that the iodine enters into the reaction in any way except to serve as a catalyst. No iodine has been found in the chlorinated products either when used alone or in conjunction with a metal of the iron group.

The reaction is exothermic and during the first hour or two cooling may be necessary to prevent undue rise of temperature. In the final stages of the reaction it may be necessary to apply external heat to maintain the chlorination temperature in batch operations. It will be apparent that the rate of chlorine addition will be such that undue amounts do not pass through the system unreacted, nor at such a rate that the reaction gets out of hand. The examples show a variety of operating conditions from which it will be apparent to one skilled in the art how they can be varied.

The operation may be carried out in continuous as well as in batch operations. Iron vessels may be used. Unreacted chlorine and hydrogen chloride may be recovered by known methods.

The following examples illustrate typical embodiments of the invention but should not be regarded as limiting it to the exact details shown.

EXAMPLE I

A commercial coumarone-indene resin of about 800 molecular weight, manufactured by the Neville Chemical Co., of Pittsburgh, Pennsylvania, by polymerization of a coal tar naphtha containing coumarone and indene was used. The properties of the resin are shown in Table IV. If this resin is contacted with chlorine at a temperature above its softening point, as in the McCoy process, some chlorination occurs but the resulting resin is extremely dark colored and unstable to heat.

The resin was dissolved in carbon tetrachloride in the proportions shown in Table I and the chlorination reaction was carried out in the absence of a catalyst under the conditions shown and had the properties indicated.

Table I

CHLORINATION OF A COUMARONE-INDENE TYPE RESIN IN CCl₄ SOLUTION IN THE ABSENCE OF CATALYST

| Run No | 78 | 77 | 76 | 82 | 85 |
|---|---|---|---|---|---|
| Resin concentration, Wt. Percent in CCl₄ | 10 | 10 | 10 | 10 | 2 |
| Temp., °C | 60–65 | 30–35 | 0–5 | 0–5 | 0–5 |
| Chlorine addition time, hrs | 7 | 7 | 7 | 24 | 7 |
| Chlorine addition rate, wt. ratio: Cl₂/resin/hr | 1.14 | 1.14 | 1.14 | 1.08 | 5.7 |
| Total chlorine added, wt. ratio: Cl₂/resin | 8.0 | 8.0 | 8.0 | 26.0 | 40.0 |
| Product Properties: | | | | | |
| Chlorine, wt. percent | 29.7 | 38.9 | 43.9 | 50.0 | 54.2 |
| Heat Stability | 1.9 | 2.3 | 3.3 | 3.0 | 2.6 |
| Neville Color | 5.7 | 3.0 | 3.8 | 3.8 | 3.5 |

The data show that as much as about 54.2% of chlorine can be introduced in the absence of a catalyst when using high ratios of chlorine to resin. The heat stabilities as determined by ASTM Method D–793–49 were poor. The ASTM method by which the amount of hydrogen chloride evolved at 180° C. was determined, was modified by utilizing sodium hydroxide in excess of that called for by the method so that direct stability comparisons could be made between the various chlorinated products of this and other examples. The values are expressed as weight percent HCl evolved based on the weight of the chlorinated resin sample.

It will be observed that the reaction takes place at temperatures from about 0° to 65° C. but that the degree of chlorination seems to be improved at the lower temperatures and with the lower concentrations of resin in the solution.

EXAMPLE II

Another series of runs was made employing the same polymer and using finely divided iron as the catalyst. The conditions of the run and the properties of the products are shown in Table II.

Table II

CHLORINATION OF A COUMARONE-INDENE TYPE (800 MOL. WT.) RESIN IN CCl₄ SOLUTION IN THE PRESENCE OF IRON CATALYST ONLY

| Run No | 79 | 80 | 81 | 84 | 83 | 86 | 152 |
|---|---|---|---|---|---|---|---|
| Fe Catalyst, Wt. Percent of resin | 8 | 8 | 8 | 8 | 8 | 8 | 3 |
| Resin concentration, Wt. Percent in CCl₄ | 10 | 10 | 10 | 10 | 10 | 2 | 15.0 |
| Temp., °C | 0–5 | 30–35 | 60–65 | 60–65 | 0–5 | 0–5 | 60–65 |
| Chlorine addition time, hrs | 7 | 7 | 7 | 24 | 24 | 7 | 4 |
| Chlorine addition rate, Wt. ratio: Cl₂/resin/hr | 1.14 | 1.14 | 1.14 | 1.08 | 1.08 | 5.7 | |
| Total chlorine added, Wt. ratio: Cl₂/resin | 8.0 | 8.0 | 8.0 | 26.0 | 26.0 | 40.0 | 4.0 |
| Product Properties: | | | | | | | |
| Chlorine, Wt. Percent | 56.7 | 58.8 | 55.0 | 61.0 | 60.0 | 54.5 | 37.1 |
| Heat Stability | .78 | 0.17 | 0.11 | 0.09 | .45 | .63 | 1.04 |
| Neville Color | 0.9 | 11 | 12 | 9 | 0.9 | 1.4 | 8 |

These data show that the chlorination reaction proceeds smoothly at temperatures from 0 to about 65° C. and that the proportion of chlorine introduced into the resin is increased substantially over that which is obtained when no catalyst is present. The higher temperatures appeared to favor heat stability of the product although the chlorinated resins produced at the lower temperatures, while less stable than those produced at higher temperature, had better color. In all instances the heat stability was greatly improved over that obtainable in the absence of a catalyst. The heat stabilities of the products from runs 80, 81 and 84 are equal or superior to those of commercial chlorine-containing resins manufactured by polymerization or condensation reactions involving chlorinated monomers. These products have considerably greater commercial utility than those produced by solution-chlorination in the absence of catalysts.

EXAMPLE III

Tests made using iodine as the only catalyst show that results somewhat similar to those using iron are obtainable although in general the color and extent of chlorination of the chlorinated product are somewhat better than those produced when using iron alone.

Table III shows typical results obtained when (1) no catalyst was present, (2) using iron but no iodine, (3) using iodine alone, (4) using iodine and iron filings in two different percentages, (5) using both iodine and iron but varying the concentration of resin in the solution, and (6) at temperatures ranging from 0° C. to 65° C.

The catalyst was added in increments of one-third at the beginning, one-third at the end of one hour and one-third at the end of two hours. The chlorination time was 4.5 hours except as otherwise indicated. In the case of Run No. 44, which was run at 8.5 hours chlorination time, similar results were obtained at 4.5 hours time except that the degree of chlorination appeared to be slightly less, being around 63% to 64%.

The chlorine content was determined by the method of Manual No. 116, Parr Instrument Company, Moline, Illinois. The heat stability was that of ASTM D-793-49, ASTM Standards, 1952, part 6, pages 826-827. The color was determined by the Neville color scale of the Neville Chemical Co. which is an electrometric adaptation of the Barrett Color method as described in "Tar Acid Testing Methods" published by the Barrett Division, Allied Chemical & Dye Company, New York, 1946.

EXAMPLE IV

In order to show the applicability of the process to various other resins, a number of commercial resins produced by the Neville Chemical Company, all being of the coumarone-indene type, were chlorinated in the presence of iron alone and in the presence of iron and iodine. To serve as a comparison, the lower molecular weight poly-

*Table III*

| Run No. | 20 | 23 | 24 | 25 | 31 | 28 | 35 | 26 | 44 |
|---|---|---|---|---|---|---|---|---|---|
| Resin, Percent | 4.8 | 4.8 | 4.8 | 4.8 | 4.8 | 4.8 | 10 | 20 | 10 |
| Iodine, Percent | 0.0 | 0.0 | 8.0 | 8.0 | 8.0 | 8.0 | 8.0 | 8.0 | 4.0 |
| Iron, Percent | 0.0 | 8.0 | 0.0 | 8.0 | 8.0 | 8.0 | 8.0 | 8.0 | 4.0 |
| Reaction time, hours | 3 | 4.5 | 4.5 | 4.5 | 4.5 | 4.5 | 4.5 | 4.5 | 8.5 |
| Reaction Temp., °C | 60 | 60 | 60 | 60 | 0-5 | 25-30 | 60 | 60 | 55-65 |
| Properties Chlorine, Percent Wt. | 38.2 | 41.6 | 60.1 | 67.1 | 61.8 | 64.2 | 63.1 | 64.5 | 65.6 |
| Neville Color | 4.6 | 6.4 | 1.5 | 2.1 | 2.1 | 2.7 | 4.5 | 6.1 | 5.1 |
| Stability | Poor | Fair | Good | Excl. | Good | Good | Excl. | Excl. | Excl. |

When using iodine alone a product of excellent color and good stability containing over 60% of chlorine was obtained. The odor of the product was mild and pleasant in contrast to an acidic odor when no catalyst is used. When using both iron and iodine under comparable conditions, namely, at 60° C. chlorination temperature, a chlorine content of 63% to about 67% was obtained, and the odor, color and heat stability of the products were excellent. The data show that at temperatures ranging from 0° C. to 65° C. heat-stable light-colored products containing well over 60% of chlorine can be obtained. These, as did all products made using iodine as the chlorination catalyst, had a mild, pleasant odor, and none of them flashed or burned at 760° F.

The data also indicate that the concentration of resin, at least up to 20% by weight of the solution has little or no effect when using both catalysts. Other experiments indicate that proportions of resin as low as 2% give comparable results. The proportion of resin can be increased above 20% subject only to the limitations previously discussed.

The data in the above examples conclusively show that chlorinated resins which are stable and of good color and odor and which contain chlorine in an amount which is not possible to introduce by prior art methods, can be produced in the presence of iodine either alone or together with iron. The presence of iron appears to be beneficial. We have conducted tests in iron vessels without the addition of iron filings and have obtained results comparable to those shown above. Consequently it would appear that the addition of iron filings is not essential except possibly in the case of very large vessels in which the contact with iron is small. The iodine apparently exerts the major influence in catalyzing the chlorination reaction to produce the desired products. Other chlorination catalysts such as cobalt or nickel can be used together with iodine, but because of the cost, iron is preferred.

All of the products produced by our process are useful, particularly where fire resistance is essential.

mers were chlorinated by the McCoy method. Table IV shows the properties of the polymers before chlorination.

*Table IV*

CHARACTERISTICS OF NINE COUMARONE-INDENE TYPE RESINS OF VARIOUS MOLECULAR WEIGHTS

[Properties before chlorination]

| Molecular Weight | Indene Monomer Units (Calc. per molecule) | R. & B. Softening Point, °C. | Neville Color |
|---|---|---|---|
| 233 | 2.0 | (330-370° C.)[1] | 0.1 |
| 270 | 2.4 | (250-355° C.)[1] | 2.7 |
| 440 | 3.8 | 63 | 1.7 |
| 660 | 5.7 | 100 | 1.0 |
| 720 | 6.2 | 110 | 1.1 |
| 800 | 6.9 | 128 | 0.7 |
| 1,360 | 11.7 | 153 | 0.7 |
| 1,720 | 14.9 | 176 | 1.1 |
| 3,500 | 30.4 | 221 | 0.2 |

[1] Boiling range from 10%-90% point on ASTM D-850.

The resins were chlorinated by dissolving 200 grams thereof in 1800 grams of carbon tetrachloride in a two liter flask equipped with a reflux condenser and stirrer. The reaction was carried out at about 60° C. in the presence of 16 grams (8% by weight of the resin) of iron filings or 16 grams of iron filings and 16 grams of iodine. Chlorine gas was passed through the solution for four hours at a rate of 6.67 grams per minute, the weight ratio of chlorine to resin being 8.0 when using a solvent, with or without a catalyst. At the end of four hours the solution was blown with nitrogen for one-half hour at 60-70° C., then cooled to 25° C. and the resultant solution shaken with 500 ml. of 2% sodium hydroxide solution for one hour. The solution layer was treated with 20 grams of Attapulgus clay at reflux temperatures and was then filtered. The solution was vacuum distilled to remove the carbon tetrachloride and the resultant chlorinated resin was crushed and air dried for one week. It might be stated here that all the chlorinated resins discussed herein were treated essentially in this manner.

The properties of the chlorinated resins are shown in Table V.

Table V

CHLORINATION OF VARIOUS COUMARONE-INDENE TYPE RESINS

| Catalysts | None McCoy (no solvent) | None (With solvent) | Iron | Iodine | Iodine +Iron |
|---|---|---|---|---|---|
| 233 mol. wts.: | | | | | |
| Run No | 64 | | 63 | 120 | 62 |
| Chlorine, percent wt | [1] 45.6 | | 58.2 | 55.1 | 66.3 |
| Heat Stability | 2.3 | | 0.1 | 0.5 | .06 |
| Color | 18 | | 9 | 1 | 6.2 |
| 270 mol. wts.: | | | | | |
| Run No | 57 | | 54 | 122 | 53 |
| Chlorine, percent wt | [1] 48.2 | | 52.5 | 54.0 | 65.3 |
| Heat Stability | 1.2 | | 0.3 | 0.9 | 0.1 |
| Color | 18 | | 12 | 3.1 | 7 |
| 440 mol. wts. (a): | | | | | |
| Run No | 75 | | 74 | | 73 |
| Chlorine, percent wt | 23.8 | | 42.7 | | 65.1 |
| Heat stability | 2.9 | | 1.6 | | 0.08 |
| Color | 20 | | 12 | | 7 |
| 440 mol. wts. (b): | | | | | |
| Run No | | 136 | 138 | 137 | 139 |
| Chlorine, percent wt | | 23.1 | 38.7 | 56.0 | 61.8 |
| Heat Stability | | 5.9 | 2.2 | 0.9 | 0.5 |
| Color | | 12 | 12 | 3.9 | 6.3 |
| 660 mol. wts.: | | | | | |
| Run No | 59 | 116 | 58 | | 55 |
| Chlorine, percent wt | 14.7 | 26.7 | 53.4 | | 62.6 |
| Heat Stability | 1.0 | 3.1 | 0.3 | | 0.04 |
| Color | 12 | 8 | 12 | | 6 |
| 720 mol. wts.: | | | | | |
| Run No | | | 70 | | 69 |
| Chlorine, percent wt | | | 50.8 | | 61.6 |
| Heat Stability | | | 0.26 | | 0.08 |
| Color | | | 12 | | 8 |
| 800 mol. wt.: | | | | | |
| Run No | | 118 | 72 | 129 | 71 |
| Chlorine, percent wt | | 31.9 | 43.1 | 58.1 | 62.8 |
| Heat Stability | | 2.9 | 0.29 | 0.36 | 0.04 |
| Color | | 3.2 | 11 | 1 | 8 |
| 1,360 mol. wt. | | | | | |
| Run No | | 119 | 61 | 125 | 60 |
| Chlorine, percent wt | | 28.5 | 54.8 | 57.2 | 64.6 |
| Heat Stability | | 1.5 | 0.07 | 0.45 | 0.03 |
| Color | | 6.0 | 12 | 1 | 6.4 |
| 1,720 mol. wt. (a): | | | | | |
| Run No | | 130 | 132 | 131 | 133 |
| Chlorine, percent wt | | 27.8 | 35.2 | 58.8 | 66.1 |
| Heat Stability | | 0.7 | 0.7 | 0.41 | 0.05 |
| Color | | 2.2 | 8+ | 1.3 | 5.4 |
| 1,720 mol. wt. (b): | | | | | |
| Run No | | | 68 | | 67 |
| Chlorine, percent wt | | | 46.3 | | 64.5 |
| Heat Stability | | | 0.14 | | 0.06 |
| Color | | | 11 | | 5.4 |
| 3,500 mol. wt.: | | | | | |
| Run No | | | 66 | | 65 |
| Chlorine, percent wt | | | 50.5 | | 64.6 |
| Heat Stability | | | 0.16 | | 0.04 |
| Color | | | 11 | | 6 |

[1] Liquid product.

The table shows that chlorination with or without a solvent resulted in the production of chlorinated resins of comparatively limited chlorine content and poor color. Both iodine and iron individually promote the chlorination of coumarone-indene type resins ranging in molecular weight from 270 to 3500, to varying degrees. In most cases resins chlorinated in the presence of iodine contain somewhat higher proportions of chlorine than when iron alone was used, although the resulting resins in general were not as heat stable as in the case of iron.

However, when these resins were chlorinated in the presence of both iodine and iron the degree of chlorination was in every instance greatly improved and the heat stabilities were much superior to those of resins produced with the individual catalyst. The data not only demonstrate the superiority of the combined catalyst but show its applicability to a variety of coumarone-indene resins from relatively low to relatively high molecular weight.

The data show an average increased chlorine content for the nine resins of 13.9% (high 22.4 and low 8.1%) when the combined catalyst was used over that obtained when iron alone was used. The average color improvement was 5 units with a high of 6 and a low of 3. It also indicates a decrease in the hydrogen chloride evolved in the heat stability test over that when using iodine alone of .35%. In view of the fact that a satisfactory heat stability should be less than 0.35 and for most purposes should be below about 0.15, this is a truly significant advance.

Some properties of a typical coumarone-indene type resin of 800 molecular weight chlorinated to 65.6% by weight are as follows: pale tan powder, 5.1 Neville color; mild, pleasant odor; heat stability @ 180° C. ASTM D-793-49 (percent HCl) 0.06; percent ash 0.015; Cleveland Open Cup Flash/fire point above 760° F.; Cube-in-Mercury Soft Point, 135° C.; solubility, grams of resin per 100 ml. solvent at room temperature (70° F.); toluene 200; chlorobenzene 200; amyl acetate, above 170; cyclohexanone, above 124; acetone, sparingly soluble; isopropyl alcohol, substantially insoluble.

EXAMPLE V

In table VI are shown a series of comparative runs using a chlorine to resin ratio of 4.0 at a time factor of four hours at a temperature of 60–65° C. using various catalysts in amounts ranging from about 3% to about 16.6%.

Table VI

COMPARISON OF CATALYSTS FOR CHLORINATING A COUMARONE-INDENE TYPE RESIN (800 MOL. WT.)

| Catalyst | None | Iron | Iodine | Iron plus Iodine | Bromine | Iron plus Bromine | FeCl$_3$ | FeCl$_2$ | FeI$_2$ |
|---|---|---|---|---|---|---|---|---|---|
| Run No.[1] | 153 | 152 | 154 | 100 | 155 | 156 | 157 | 158 | 159 |
| Chlorine, percent wt | 32.2 | 37.1 | 57.8 | 59.6 | 37.9 | 40.3 | 42.6 | 52.3 | 60.0 |
| Heat Stability | 2.4 | 1.04 | 0.63 | 0.05 | 2.9 | 0.87 | 0.69 | 0.09 | 0.07 |
| Color | 3.5 | 8 | 0.8 | 6 | 3.3 | 8 | 11.5 | 12 | 11.5 |

[1] Time, 4 hours. Cl: resin=4.0.

This data show that the degree of chlorination was increased when using iron, iodine, bromine, ferric chloride, ferrous chloride and ferrous iodide. The use of iron and iodine together or ferrous iodide produced the highest degree of chlorination in this series of runs. Bromine had approximately the same effect as iron, however, when iron and bromine were employed together there was only a small increase (approximately 2–3%) over the use of either alone. This shows that iodine and bromine are not equivalent in this process.

Ferric chloride had slightly better chlorinating effect than iron alone and ferrous chloride was substantially more active, producing a resin containing 52.3% chlorine with an excellent heat stability of less than 0.1% HCl. Addition of iodine will improve these results. Ferrous iodide had about the same activity as iron plus iodine under these test conditions, although the color was not as good in the case of the ferrous iodide catalyst.

EXAMPLE VI

Table VII is a comparison of the heat stabilities of resins chlorinated to varying chlorine contents in the absence of catalysts (with solvent) and in the presence of iron or iodine or a mixture of iron and iodine.

Table VII

CHLORINATION OF COUMARONE-INDENE TYPE RESIN (800 MOL WT.)

| Catalyst | None | Iron | Iodine | Fe+ Iodine |
|---|---|---|---|---|
| Percent Cl | 13.9 | | 14.4 | 13.3 |
| Stab | 0.83 | | 1.1 | 1.2 |
| Percent Cl | 22.5 | | 22.9 | |
| Stab | 1.5 | | 1.4 | |
| Percent Cl | 24.9 | | | 24.0 |
| Stab | 2.1 | | | 1.3 |
| Percent Cl | 29.7 | | | 30.7 |
| Stab | 1.9 | | | 0.75 |
| Percent Cl | 32.4 | 37.1 | 34.7 | 39.0 |
| Stab | 2.4 | 1.04 | 0.86 | 0.44 |
| Percent Cl | 50.0 | 43.1 | 43.1 | 47.8 |
| Stab | 3.0 | 0.29 | 1.0 | 0.28 |
| Percent Cl | 54.2 | 52.5 | 48.8 | 56.7 |
| Stab | 2.6 | 0.27 | 0.41 | 0.07 |
| Percent Cl | | 61.0 | 60.7 | 59.1 |
| Stab | | 0.09 | 0.25 | 0.07 |
| Percent Cl | | | 63.1 | 63.4 |
| Stab | | | 0.05 | 0.06 |
| Percent Cl | | | | 65.1 |
| Stab | | | | 0.05 |
| Percent Cl | | | | 68.4 |
| Stab | | | | 0.05 |

This data show that catalytically chlorinated resins have increasingly stabilities as the chlorine content increases above about 40%. In contrast to this the heat stabilities of resins chlorinated in the presence of a solvent but in the absence of a catalyst actually appeared to decrease in heat stability. This indicates that the presence of a catalyst not only makes it possible to increase the chlorine content and effect other economies such as the matter of time but appears to effect a selective chlorination so as to produce resins wherein the chlorine is stably combined. The use of the combined iron and iodine catalyst appears to result in an even more selective chlorination resulting in improved stability as well as making it possible to reach a higher ultimate degree of chlorination than with the individual catalyst.

To the best of our knowledge our process has for the first time made it possible to chlorinate coumarone-indene type resins having useful properties at chlorine content in excess of 40–43% and more, particularly in the range of about 50 to about 68%, these resins being new as compositions of matter.

It should be borne in mind that the coumarone-indene type resins are, as a practical matter, not produced from pure compounds but are mixtures containing polymerizable materials. The exact composition of a given resin would depend to a large extent upon the source of the naphtha from which the starting resin was produced and upon its composition when considered in terms of the exact polymerizable materials contained therein. This may vary from time to time or from batch to batch, of the resin produced. Consequently, the data herein supplied are to be considered illustrative and not intended to unduly restrict the scope of the invention.

We claim as our invention:

1. The process of chlorinating a coumarone-indene polymer which comprises forming a solution of said polymer in a non-reactive solvent, chlorinating said polymer by passing chlorine into said solution in a reaction zone, the weight ratio of chlorine to said polymer being at least about 1.7:1, for a period of at least about 3 hours, said chlorination being carried out in admixture with a catalyst selected from the group consisting of ferrous iodide, and a metal of the iron group plus iodine, said catalyst being present in an amount of at least 0.5% by weight of the original polymer, maintaining the temperature in said zone within the range of about −40° to about 100° C., continuing to pass chlorine into said solution until the weight percent of combined chlorine is at least about 50% of the chlorinated polymer, and recovering the resulting light-colored chlorinated polymer having an ASTM-D-49 heat stability at 180° C. of not more than about 0.35.

2. The process of claim 1 wherein the catalyst comprises at least 0.2% iodine and at least about 0.2% metallic iron, by weight of the original polymer.

3. The process of claim 1 wherein the chlorination is carried out until the chlorine content of the chlorinated polymer is at least 60% by weight.

4. The process of claim 1 wherein the solution of the polymer undergoing chlorination contains not more than about 50% by weight of dissolved polymer.

References Cited in the file of this patent

UNITED STATES PATENTS

| 1,245,363 | McCoy | Nov. 6, 1917 |
| 1,674,472 | Jaeger | June 19, 1928 |
| 1,741,305 | Jaeger | Dec. 31, 1929 |
| 2,748,105 | Becker et al. | May 29, 1956 |

OTHER REFERENCES

Bachman et al.: J. Orig. Chem., 12, 1947, pp. 108–21, p. 118 only.